United States Patent [19]
Maki et al.

[11] 4,167,197
[45] Sep. 11, 1979

[54] DIRECTIONAL CHANGE-OVER VALVE

[76] Inventors: Toshio Maki, Yokohama; Isao Oki, Kawasaki; Kiyoshi Shirai, Tokyo, all of Japan

[21] Appl. No.: 757,861

[22] Filed: Jan. 10, 1977

Related U.S. Application Data

[63] Continuation of Ser. No. 190,586, Oct. 19, 1971, abandoned.

[30] Foreign Application Priority Data

Oct. 20, 1970 [JP] Japan .................................. 45-91593

[51] Int. Cl.² ........................ F15B 13/08; F16K 11/10
[52] U.S. Cl. ..................................... 137/271; 91/526; 91/531; 91/532; 137/269; 137/596
[58] Field of Search ............... 137/596, 596.12, 596.13, 137/454.2, 454.6, 269, 271; 91/411 R, 526, 531, 532

[56] References Cited
U.S. PATENT DOCUMENTS

| | | | |
|---|---|---|---|
| 2,456,651 | 12/1948 | Schmiel | 137/454.6 X |
| 2,873,762 | 2/1959 | Tennis | 137/596.13 |
| 2,922,432 | 1/1960 | Huntington et al. | 137/454.2 X |
| 3,134,402 | 5/1964 | Tennis | 137/596 |
| 3,216,443 | 11/1965 | Schmiel | 137/269 |
| 3,267,966 | 8/1966 | Williams | 137/596.12 X |
| 3,635,244 | 1/1972 | Lamborghini | 137/271 X |

*Primary Examiner*—Irwin C. Cohen
*Attorney, Agent, or Firm*—Armstrong, Nikaido, Marmelstein & Kubovcik

[57] ABSTRACT

A directional change-over valve which has a valve body having connecting surfaces at both sides thereof, a spool slidably inserted into the valve body, a check valve replaceable depending upon utilities thereof, wherein the valve body has a plurality of valve chambers, the central valve chamber is communicated with the hole for mounting the check valve for removably mounting the check valve, passages are provided opening at the connecting surfaces of the valve body in the respective valve chambers, another passages are provided for connecting the interior of the check valve to the both side valve chambers to form parallel, tandem and series circuits. Thus, this invention simplifies the structure and circuits to provide a compact directional change-over valve device as a whole.

11 Claims, 7 Drawing Figures

FIG. 2

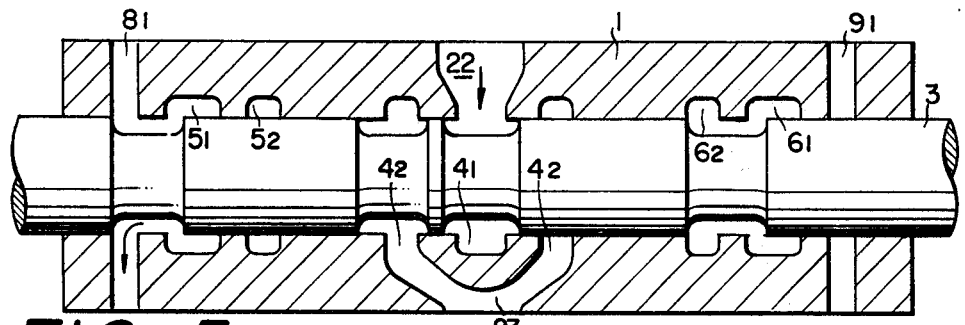
FIG. 5
FIG. 6
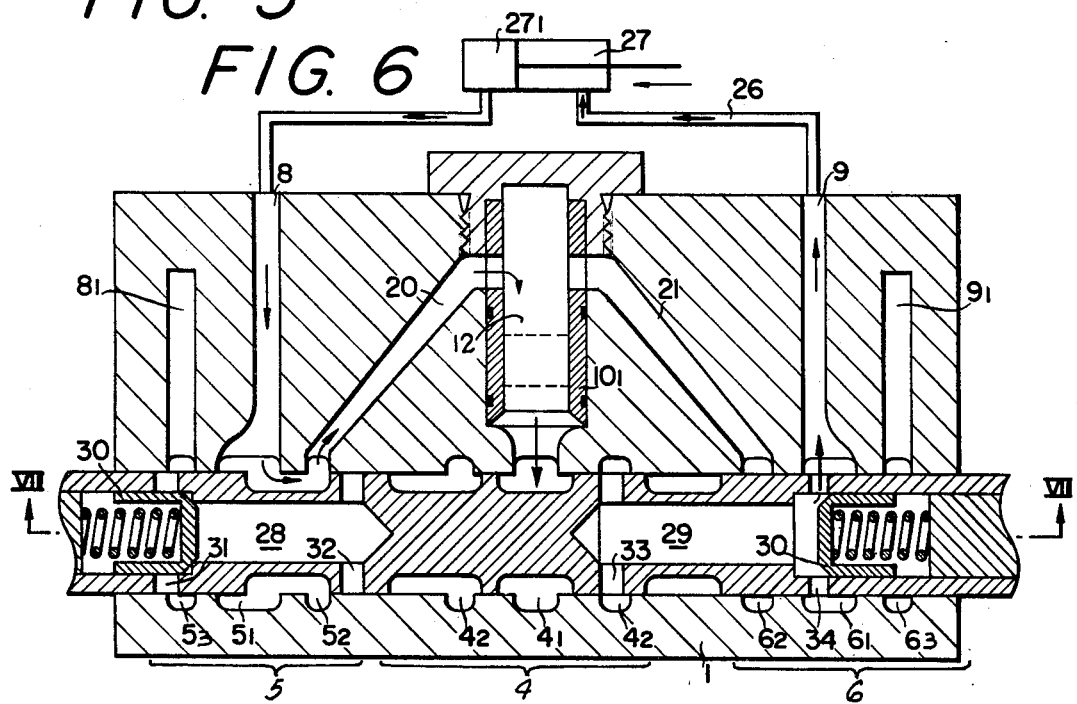
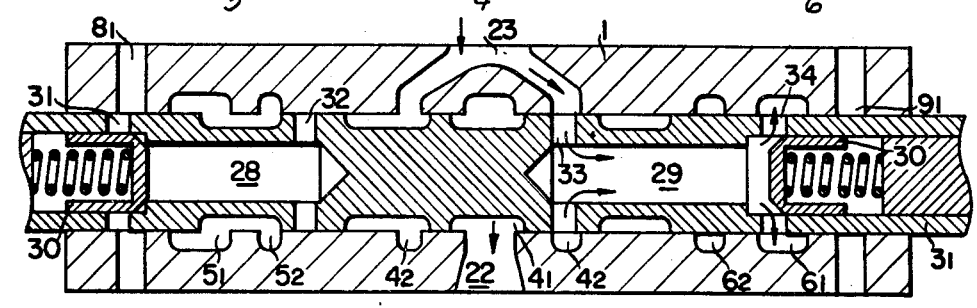
FIG. 7

DIRECTIONAL CHANGE-OVER VALVE

This is a continuation of application Ser. No. 190,586, filed Oct. 19, 1971, now abandoned.

This invention relates to improvements in a directional change-over valve device used mainly in the hydraulic circuits of construction machinery and industrial vehicles.

Heretofore, the directional change-over valves used in this type of hydraulic circuit are used in such a manner that independent plural valves are connected in parallel, tandem or series with each other, depending upon their utilities. Also, parallel valve, tandem valve or series valve arrangements in three types have been previously manufactured. However, such usages are very complicated in structure.

This invention contemplates the reduction of difficulty in manufacturing various types of valves for a multiplicity of respective utilities, and has an object to provide a directional change-over valve device which may be used as a parallel valve, tandem valve and series valve merely by exchanging a replaceable part, and may simultaneously be used in special combination such as in series, tandem and parallel.

The characteristic feature of this invention is a directional change-over valve which comprises a valve body having connecting surfaces at both sides thereof, a spool slidably inserted into the valve body, a check valve or spool with check valves replaceable depending upon the utilities thereof, wherein the valve body has a plurality of valve chambers, the central valve chamber is communicated with the hole for mounting the check valve and for removably mounting the check valve. Passages are provided which open at the connecting surface of the valve body in the respective valve chambers, another passages are provided for connecting the interior of the check valve to the both side valve chambers to form parallel, tandem and series circuits.

The object, features and advantages of this invention will become apparent from the following description taken in conjunction with the accompanying drawings, in which:

FIG. 5 is a sectional view of the device taken along the line V—V in FIG. 4;

FIG. 6 is a longitudinal sectional view of the directional change-over valve device having a series circuit of this invention; and FIG. 7 is a sectional view of the device along the line VII—VII in FIG. 6.

Figure 1:
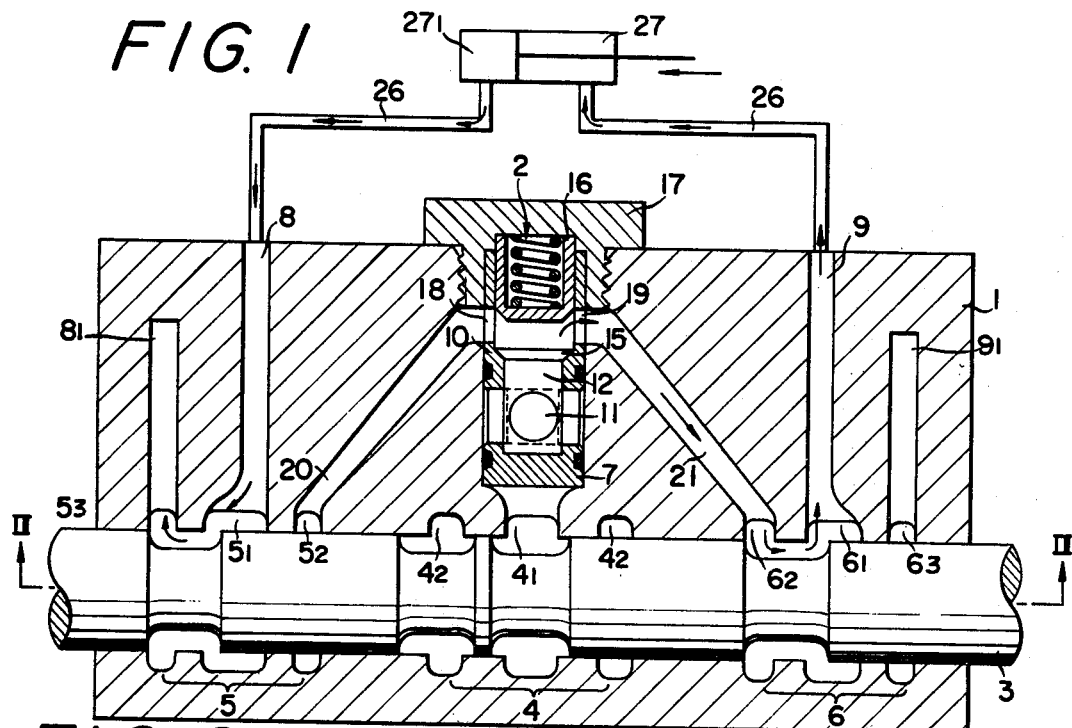
FIG. 1 is a sectional view of one embodiment of the directional change-over valve device having a parallel circuit constructed according to this invention taken along the line I—I by two in FIG. 2.
Figure 2:
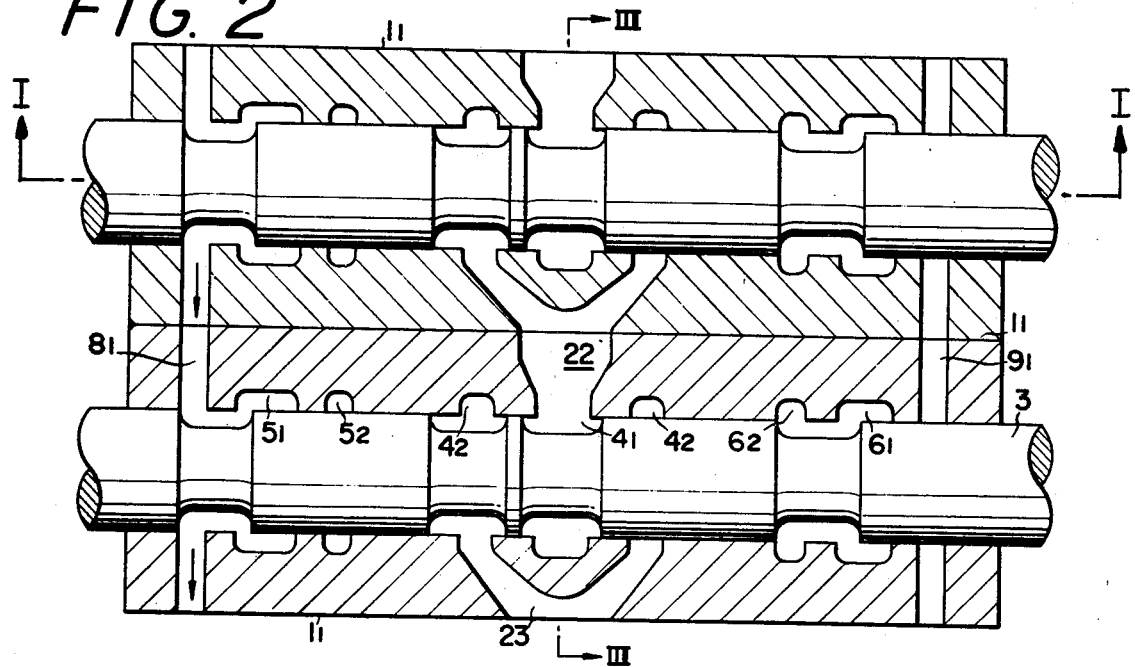
FIG. 2 is a sectional view of the device taken along the line II—II in FIG. 1.
Figure 3:
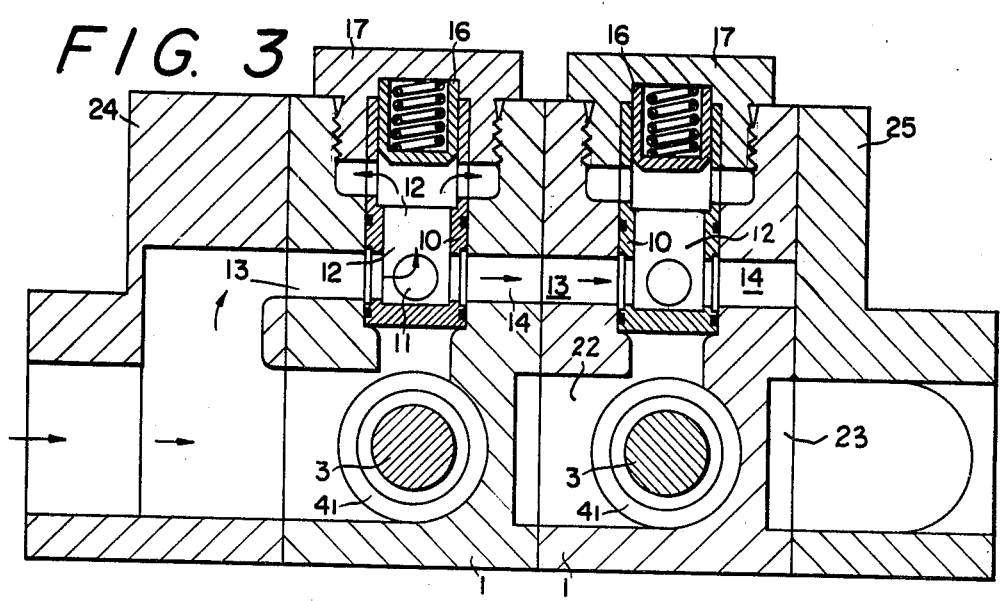
FIG. 3 is a sectional view of the device taken along the line III—III in FIG. 2.

Reference is now made to the drawings, particularly to FIGS. 1 to 3, which show one embodiment of the directional change-over valve device of this invention.

Reference numeral 1 illustrates a valve body of this directional change-over valve device forming a parallel circuit with a check valve 2 replaceably mounted thereto. More particularly, the valve body 1 has flat connecting surfaces $1_1$, $1_1$ at both sides thereof in block state, and a spool 3 is slidably inserted through the valve body 1 in longitudinal direction at bottom side thereof. Three valve chambers 4, 5 and 6 are formed at the center and both sides thereof around the spool 3 in the valve body 1. The valve chambers 4 are composed of main valve chamber $4_1$ having a relatively broad width and a pair of sub valve chambers $4_2$, $4_2$ having relatively narrow width and disposed at both sides of the main valve chamber $4_1$. The main valve chamber $4_1$ is communicated with the bottom portion of the hole 7 for mounting the check valve 2 and formed through the upper surface of the valve body 1 therein. Other valve chambers 5 and 6 are formed similarly to the valve chambers 4 in such a manner that the valve chambers 5 have a main valve chamber $5_1$ and sub valve chambers $5_2$, $5_3$, and the valve chambers 6 have a main valve chamber $6_1$ and sub valve chambers $6_2$, $6_2$ similarly constructed to the valve chambers $4_1$ and $4_2$. The main valve chambers $5_1$ and $6_1$ are opened at the upper surface of the valve body 1 through passages 8 and 9 formed in the valve body 1, and one of the sub valve chambers $5_2$ and $6_2$ are communicated with passages $8_1$ and $9_1$, respectively opening at the connecting surfaces of the valve body 1.

On the other hand, a hollow cylinder 10 having a bottom is inserted into the hole 7 for mounting the check valve 2. Holes 11 are opened in four directions at the lower side peripheral surface of the cylinder 10, and are communicated with a passage 12 formed in the cylinder 10, and the opposite two holes 11 are communicated with passages 13 and 14 (See FIG. 3) opening at the connecting surfaces $1_1$ of the valve body 1, respectively. The hollow cylinder 10 is so formed that its upper part is slightly larger in diameter than its lower portion, and stepped valve seat 15 is formed at the boundary of the upper and lower portions of the cylinder 10. This valve seat 15 is so provided that the bottom of a check valve body 16 is slidably inserted into the cylinder 10 from the upper end of the cylinder 10 so as to slidably move the check valve body 16 elevationally up and down. The upper opening of the cylinder 10 is closed by a plug 17 screwed into the opening of the hole 7 for mounting the check valve 2 of the valve body 1. A pair of holes 18 and 19 are formed through both side ends of the valve body 1 above the valve seat 15 of the cylinder 10, and these holes 18 and 19 are communicated with the upper ends of the inclined passages 20 and 21 formed in the valve body 1, and the lower ends of the inclined passages 20 and 21 are communicated with one of the sub valve chambers $5_2$ and $6_2$, respectively of the valve chambers 5 and 6.

A communication passage 22 opening at one connecting surface $1_1$ of the valve body 1 is formed at the side of the main chambers $4_1$ of the valve chamber 4, and another communication passage 23 opening at the other connecting surface $1_1$ of the valve body 1 is formed at the side of the sub chambers $4_2$ of the valve chambers 4.

In order to form a parallel circuit in the valve body 1 thus constructed, as shown in FIG. 3, the connecting surfaces $1_1$ of the valve bodies 1 are connected in a sealed fashion, and auxiliary brackets 24 and 25 are installed to both sides of the valve bodies 1. A cylinder 27 with a piston $27_1$ is connected as a driven device by connecting pipes 26 to the passages 8 and 9 opened at the upper surface of the valve body 1.

In operation of the thus constructed directional change-over valve device since the main valve chamber $4_1$ is shut off from the passage 22, oil under pressure from a pump (not shown) is fed from one bracket 24 through the passage 13, passage 12 of the cylinder 10, where the flow diverges and one part is fed into the valve body 1 of the next stage, adjacent to the auxiliary bracket 25 while the other is fed to urge the valve body 1 up to passage from the hole 19 of the cylinder 10 through one inclined passage 21 into the sub valve chamber $6_2$ of the valve chambers 6, and then from the sub valve chambers $6_2$ through the cutout of the spool 3 and the main valve chamber $6_1$, through the passage 9 into the cylinder 27 so as to urge the piston $27_1$ in the direction as designated by an arrow. Oil fed out from the cylinder 27 is fed from the passage 8 through the main and sub valve chambers $5_1$ and $5_3$ of the valve chambers 5, and then from the passage $8_1$ into a tank (not shown). On the other hand, hydraulic oil supplied from the passage 14 of the valve body 1 of the previous stage is supplied to the passage 13 of the valve body 1 adjacent to the auxiliary bracket 25 to flow similarly to the previous stage so as to move the piston $27_1$ of the cylinder 27. Thus, oil is fed in parallel circuit formed in a the valve bodies 1.

Figure 4:
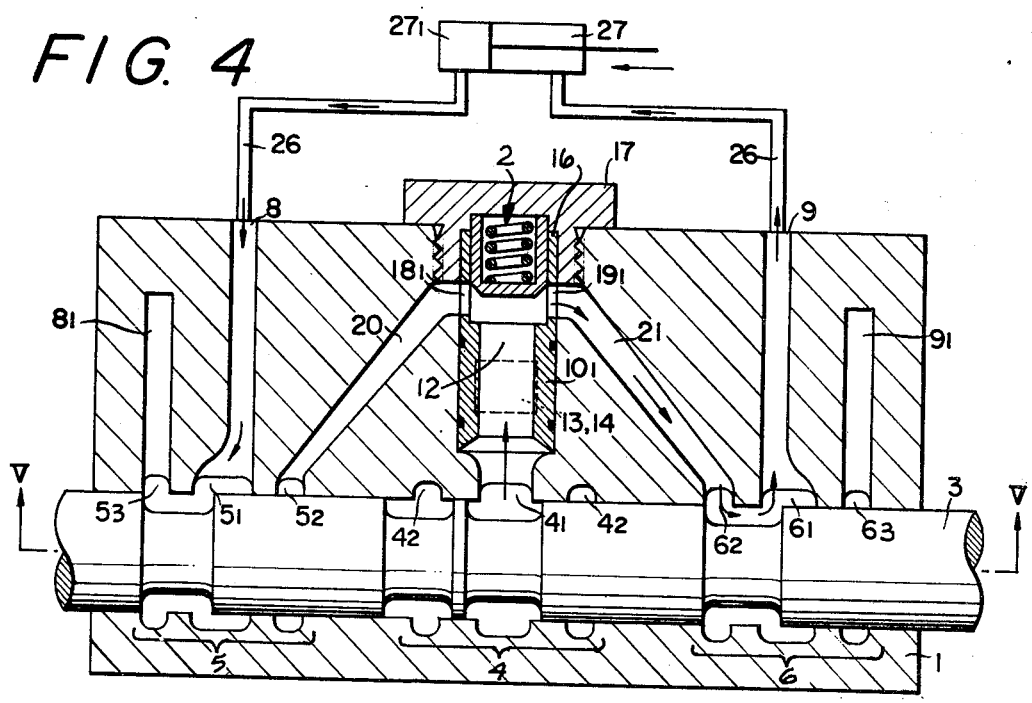
FIG. 4 is a sectional view of another embodiment of the directional change-over valve device having a tandem circuit constructed in accordance with this invention.

Referring now to FIGS. 4 and 5, which show another embodiment of the directional change-over valve device of this invention having another check valve 2 mounted in the valve body 1 wherein plural valve bodies are connected in a sealed manner to form a tandem circuit, a check valve used in this direction change-over valve device has a cylinder $10_1$ opened at its bottom with the structure provided with holes $18_1$ and $19_1$ communicated with inclined passage 20 and 21, respectively and generally at the intermediate portion of the cylinder $10_1$.

In operation of the thus constructed directional change-over valve device, oil fed from a pump (not shown) is fed through the main valve chamber $4_1$ of the valve chambers 4, from which oil is partly fed from the bottom of the cylinder $10_1$ through the passage 12, one hole $19_1$, inclined passage 21 into the sub and main valve chambers $6_2$ and $6_1$ of the valve chambers 6, and further from the passage 9 into the cylinder 27 so as to urge the piston $27_1$ in the direction as designated by an arrow. Oil fed out of the cylinder 27 is fed from the passage 8 through the main and sub valve chambers $5_1$ and $5_3$ of the valve chambers 5 and from the passage $8_1$ into a tank (not shown). Whereupon, since the passage 13 and 14 are closed by the cylinder $10_1$, oil does not flow from this part into the valve body 1 of the next stage. Thus, the hydraulic circuit of this directional change-over valve device forms a tandem circuit.

Reference is now made to FIGS. 6 and 7, which show still another embodiment of the directional change-over valve of this invention having spool 3 replaced for forming a series circuit.

A spool $3_1$ used in this directional change-over valve has two hollow passages 28 and 29 formed therein as shown in the drawings, check valve bodies 30 which has the same function as that of check valve body 16 shown in FIGS. 1, 3 and 4 are contained in the hollow passages 28 and 29, respectively, and holes 31, 32, 33 and 34 opened in communication with the respective valve chambers 4, 5 and 6 through the hollow passages 28 and 29 on the peripheral surface of the spool $3_1$.

In operation of the thus constructed directional change-over valve device, oil fed from a pump (not shown) is fed from the valve chambers $4_2$ of the valve chambers 4, from which oil is fed from one passage 29 of the spool $3_1$ into the main valve chambers $6_1$ of the valve chambers 6, and further from the passage 9 into the cylinder 27 so as to urge piston $27_1$. Oil fed out of the cylinder 27 is fed from the passage 8 into the main valve chamber $5_1$ of the valve chambers 5, and further from the cutout of the spool $3_1$ through the sub valve chamber $5_2$ into the inclined passage 20 and then to the cylinder $10_1$. Oil is further fed from the cylinder $10_1$ through the bottom of the valve body 1 into the main valve chamber $4_1$ of the valve chamber 4, and then from the passage 22 into the next stage. In this operation, oil in the cylinder $10_1$ does not flow into the valve body 1 of the next stage similarly to the case of the tandem circuit, but oil returned in the cylinder 27 is fed from the passage 8 through the valve chambers 5 into the inclined passage 20, and then from the cylinder $10_1$ through the valve chamber $4_1$ into the valve body 1 of the next stage to form a series circuit.

It should be understood from the foregoing description that the directional change-over valve of this invention may provide a parallel, tandem and series circuitry merely replacing the check valve or spool as replaceable parts in the same valve body and may also provide any combination of the three circuit upon requirement. Thus, the difficulties in manufacturing the respective different valve devices and for connecting the valve bodies by pipes are eliminated so as to simplify the structure and circuits to provide a compact device as a whole.

What is claimed is:

1. A valve device capable of operating in a parallel, series or tandem hydraulic circuit, said device comprising a valve body having opposite flat connecting surfaces at both sides thereof; a bore through said valve body; and interchangeable spool means, having cutouts on the surface thereof, said spool being longitudinally slidably positioned in said bore; a hole in said valve body; said valve body having at least three valve chamber groups contiguous with said bore including a center group and two side groups, each group comprising a main valve chamber and a sub valve chamber on each side of said main valve chamber; said main valve chamber of said center group of said valve chamber groups communicating directly with said hole, said hole being peripendicular to the axis of said spool means and parallel with said connecting surfaces of said valve body; a first port within said valve body on the connecting surface of said valve body connected to said central valve chamber group and a bypass passage passing through said valve body between the connecting surfaces of said valve body, said main valve chamber of said center group communicating with said first port and said hole of said valve body communicating with said bypass passage; said valve body having at least two inclined passages having one end at the respective sub valve chambers of said side valve chamber groups which are towards the center valve chamber group and the other end connected to said hole at a position not crossed by said bypass passage of said valve body; two supply passages in said body each said supply passage being perpendicular to the axis of said spool and parallel to said connecting surfaces of said valve body wherein each main valve chamber of said side valve chamber groups communicate with one of said supply passages; drain passages in said valve body, the sub valve chambers of the side valve chambers communicating with said drain passages passing through said connecting surfaces of said valve body; said valve body further including a second port, said sub valve chambers of the center valve chamber group communicating with said second port at said connecting surface opposite to that of said first port; and an interchangeable element means slidably inserted into said hole in said valve body, said element means including passages therethrough communicating with at least one of said bore, bypass passage, and inclined passages.

2. A valve device according to claim 1, wherein said interchangeable element means is a check valve inserted into the hole of said valve body, said check valve communicating with said inclined passages and said bypass communicating between the opposite connecting surfaces, and wherein said inclined passages communicate therewith through said check valve; wherein a flow path is formed from the bypass passage through said check valve, through one of the inclined passages, through one of the sub valve chambers positioned towards the center valve chamber group of one side valve chamber group, and through the main valve chamber thereof, communicating through the cutout of said spool with the sub valve chamber, through one of the supply passages at the connecting surface of said valve body, through a hydraulic circuit, through another supply passage, through the main valve chamber of the other side valve chamber group and through the outside sub valve chamber, which communicates through the cutout of said spool with the main valve chamber thereof, to the drain passage; wherein the other inclined passage communicates with the inside valve chamber of the side valve chamber group but is shut off from the main valve chamber of the side valve chamber group by said spool means, wherein when said spool means is slidably shifted, a reverse flow path is formed; and wherein when a multi-valve device is formed by plural valve devices and said spool is in a position such that the main valve chamber of said center valve chamber group communicates with the sub valve chambers thereof, the sub valve chambers of the center valve chamber group communicate with the main valve chambers of the center valve chamber groups of adjacent valve bodies and the bypass passages of said valve bodies communicate with all adjacent valve bodies.

3. A valve device according to claim 1, wherein said element means is a check valve inserted into the hole of said valve body such that said check valve communicates with the main valve chamber of said center valve chamber group, is shut off from said bypass passage, and communicates with the inclined passages; wherein a first flow path is formed from the main valve chamber of said center valve chamber group through said check valve, through one of the inclined passages of said valve body, through the sub valve chamber of one side valve chamber group towards the center valve chamber group, through the main valve chamber thereof communicating through the cutout of said spool with the sub valve chamber thereof, through one of said supply passages to a supply port at the connecting surface of said valve body, and a second flow path is formed from another supply port, through the other said supply passage through the main valve chamber of the other side valve chamber group, and through the outside sub valve chamber thereof, communicating through the cutout of said spool with the main valve chamber thereof, to the drain port; wherein the other inclined passage communicates with the inside sub valve chamber of the other side valve chamber group and is shut off from the main valve chamber of the side valve chamber group by said spool; wherein when said spool is slidably shifted, a reverse flow path is formed; and wherein when a multi-valve device is formed by plural valve devices and said spool is in a neutral position, the main valve chamber of said center valve chamber group communicates with the sub valve chamber thereof which communicates with the main valve chambers of the center valve chamber groups of adjacent valve bodies and wherein the bypass passages thereof do not communicate therewith.

4. A valve device according to claim 1, wherein said element is a cylinder inserted into the hole of said valve body such that said cylinder communicates with the main valve chamber of said center valve chamber group, is shut off from said bypass passage and communicates with the inclined passages; and wherein said spool has a pair of check valves provided at both ends thereof; wherein a first flow path is formed from one of the two sub valve chambers of said center valve chamber group through a hydraulic oil inlet port provided at said spool to urge the check valve thereat, through the main valve chamber of one side valve chamber group, through one of said supply passages to the supply port at the connecting surface of said valve body, and a second flow path is formed through another supply port, through the other said supply passage, through the main valve chamber of the other side valve chamber group, through the sub valve chamber thereof towards the center valve chamber group of the other side valve chamber group, communicating through the cutout of said spool with the main valve chamber thereof, through one of the inclined passages of said valve body, and through said cylinder in the hole of said valve body to the main valve chamber of said center valve chamber group; and wherein in a multi-valve device, a flow path is formed to two sub valve chambers of the center valve chamber group of the adjacent valve bodies, and wherein when said spool is slidably shifted, a reverse flow path is formed; and wherein when said spool is in the neutral position, a flow path is formed from the two sub valve chambers of the center valve chamber group through the cutout of said spool to the main valve chamber thereof to be supplied directly to the sub valve chambers of the adjacent valve bodies.

5. A valve device according to claim 2, wherein said element means further comprises a hollow cylinder of different inner diameters having a bottom inserted into the hole for mounting said check valve and also having two holes formed therein near the bottom on the periphery thereof for communicating with the bypass passages, a valve seat formed at the boundary of said different inner diameters of said hollow cylinder, said hollow cylinder further having upper openings opening into the inclined passage in the vicinity of said valve seat perpendicular to the hole communicating with said bypass passage, said check valve being slidably inserted into the upper opening of said cylinder, a plug directly screwed into the opening, and a spring provided between said plug and said check valve.

6. A valve device according to claim 3, further comprising a hollow cylinder opening into the passage in said valve body which communicates with the main valve chamber of said center valve chamber group said cylinder having a valve seat formed at the boundary of different inner diameters and two holes opening into the inclined passages, said check valve being slidably inserted into the upper opening of said cylinder, a plug directly screwed into the opening, and a spring provided between said plug and said check valve.

7. A valve device according to claim 4, further comprising a hollow cylinder opening into the passage of said valve body which communicates with the main valve chamber of said center valve chamber group at one end thereof and contacted at the other end with a plug directly screwed in said valve body, said cylinder having two holes opening into said inclined passage in the vicinity of the center on the periphery thereof.

8. A valve device according to claim 7, wherein said spool means has two stepped holes of different diameters at both ends thereof, a valve seat is provided at the boundary of the different inner diameters, a hole passes therethrough in the vicinity of said valve seat on the periphery of the large diameter and another hole passes therethrough in the vicinity of the opening end of the smaller diameter on the periphery thereof, said check valve being slidably inserted into the open end thereof, said valve further including a plug screwed into said opening, and a spring provided between the rear portion of said check valve and said plug.

9. A valve device according to claim 1, wherein said spool means has respective first cutouts formed near both ends thereof and second cutouts disposed at both sides of a land at the center thereof, wherein when said spool means is in the neutral position, the main valve chamber of said center valve chamber group communicates with the two sub valve chambers thereof and the cutouts on both sides of said spool coincide with the main valve chambers of said side valve chamber groups so that said main valve chambers thereof are shut off from the respective sub valve chambers thereof by the respective lands.

10. A valve device according to claim 1, further comprising one or more additional valve bodies in a multivalve device, at least one of said additional valve bodies comprising an auxiliary valve body having opposite parallel surfaces, an input port on one of said opposite parallel surfaces and a passage communicating with the main valve chambers of said center valve chamber groups of the adjacent valve body and with the bypass ports of the adjacent valve body.

11. A valve device according to claim 1, further comprising one or more additional valve bodies in a multivalve device, at least one of said additional valve bodies having three holes passing through the parallel opposite surfaces thereof, one of said holes communicating with the sub valve chambers of said center valve chamber group of adjacent valve bodies, the second hole communicating with the respective sub valve chambers of said side valve chamber groups of adjacent valve bodies, and the third hole communicating with the respective drain ports of adjacent valve bodies.

* * * * *